E. C. WESCOTT.
ELECTRIC CURRENT TRANSFORMER.
APPLICATION FILED DEC. 4, 1911.
1,048,436.
Patented Dec. 24, 1912.
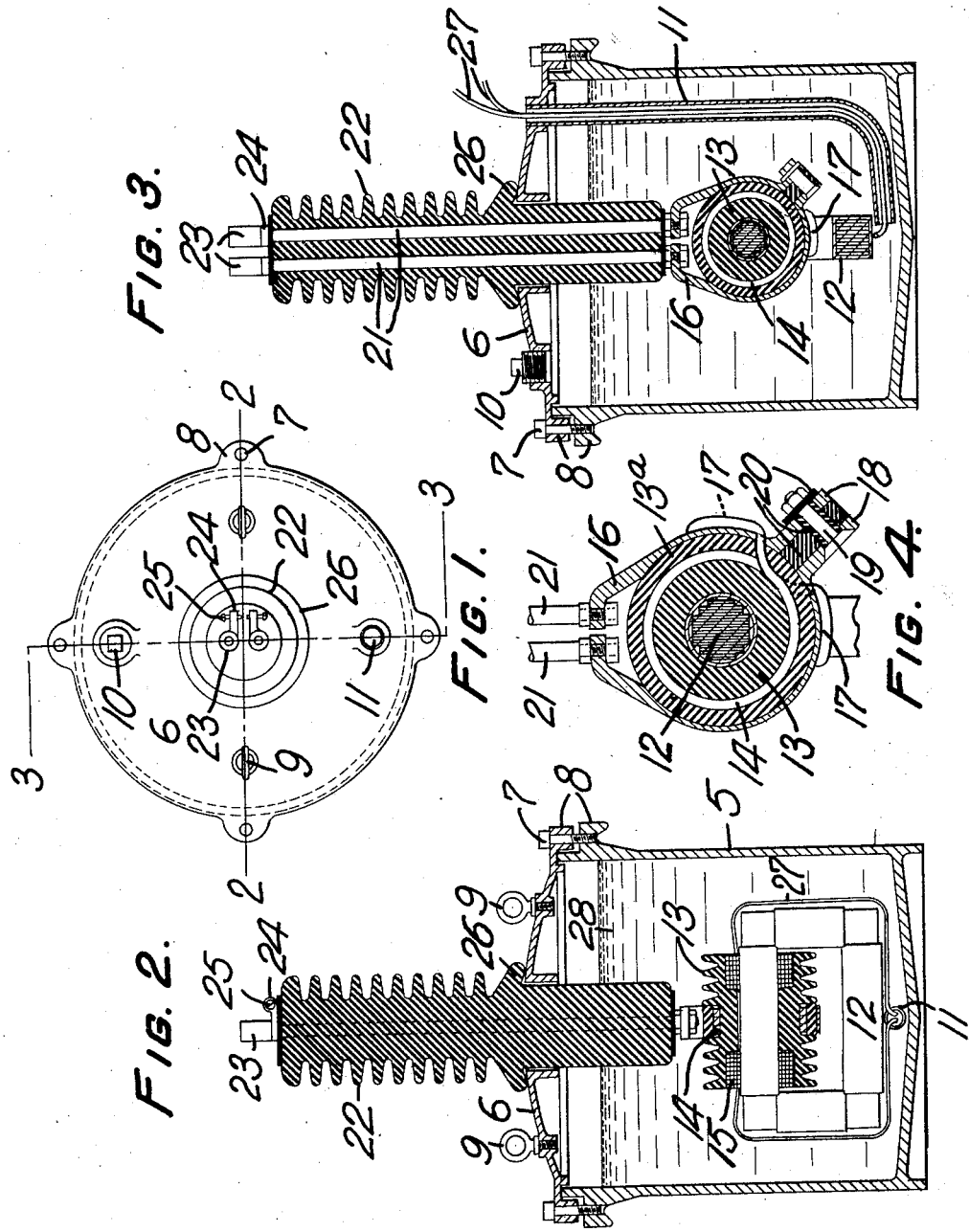
WITNESSES
INVENTOR
Edson C. Wescott.
By
His Attorney.

UNITED STATES PATENT OFFICE.

EDSON C. WESCOTT, OF SACRAMENTO, CALIFORNIA.

ELECTRIC-CURRENT TRANSFORMER.

1,048,436.  Specification of Letters Patent.  Patented Dec. 24, 1912.

Application filed December 4, 1911. Serial No. 663,667.

*To all whom it may concern:*

Be it known that I, EDSON C. WESCOTT, a resident of the city of Sacramento, in the State of California and United States of America, have invented new and useful Improvements in Electric-Current Transformers, and do hereby declare that the following is a full, clear, and exact description of same.

This invention relates to improvements in electric current transformers, and is particularly adapted for high voltage circuits where high dielectric strength and high insulating resistance are required.

The primary object of this invention is to provide a transformer of high dielectric strength and low first cost that will occupy a comparatively small space, and at the same time have good regulation and high efficiency.

A further object is to provide means for eliminating the danger of short circuit through the members suspending the transformer windings.

The transformer consists essentially of a closed tank containing oil in which is submerged a suitably shaped mass of magnetic material upon which the primary and secondary windings are placed. The primary leads pass out of the transformer through an insulating bushing and are so formed as to support the core and windings thereon.

In the drawings which illustrate this invention:—Figure 1 is a plan view of the transformer. Fig. 2 is a vertical section on the line 2—2, Fig. 1. Fig. 3 is a vertical section on the line 3—3, Fig. 1. Fig. 4 is an enlarged sectional view of the transformer core, suspension windings and insulating spool or bushing, as shown in Fig. 3.

Referring more particularly to the drawings, 5 designates a casing of suitable size and shape provided with a cover 6 attached thereto by bolts 7 passing through lugs 8, formed on the cover of the tank. The cover is provided with lifting eyes 9, a filling plug 10 and a protective conduit 11 for the secondary leads, which conduit extends to the bottom of the core.

The transformer proper consists of the preferably rectangular core 12 which may be of laminated iron or other suitable material. Mounted on this core is an insulating bushing 13 upon which the primary windings 14 and secondary windings 15 are placed. It will be noted in the drawings that the primary windings are at the center of the bushing located externally thereof, while the secondary windings are at the ends of the bushing and located internally. This arrangement may be altered as required or an additional bushing placed on the opposite side of the core, and provided with primary and secondary windings connected with the corresponding windings of the first bushing.

The bushing 13 is surrounded by a clamping band 16 which is separated from the primary winding by a ring of insulating material 13ᵃ and is formed in two parts. The two parts of the band are connected to opposite ends of the primary winding, as indicated at 17 and form terminals for this winding, and at the same time comprise one primary turn. Each part of the band is provided at one end with a lug 18, which lugs are connected by a bolt 19 passing through suitably arranged insulating members 20, so that the parts of the band while mechanically connected are not electrically connected. The opposite end of each part of the band is connected to a rod 21. These rods which are the primary leads pass out of the transformer through the insulating bushing 22, in which they are molded separately. The upper extremities of the rods 21 are provided with suitable nuts 23 which form terminals for the high voltage line. Immediately under the nuts 23 are small bars 24 provided with screws 25 which may be adjusted toward or away from each other, so as to regulate the spark gap between the primary leads. It will be noted in the drawings that the ends of the band 16 which attach to the primary leads are spaced apart and serve to connect the primary leads and primary winding. The bushing 22 passes some distance into the casing and is provided with an externally supporting collar 26 resting on the top of the cover 6. The secondary leads 27 pass from the secondary winding around the core 12 and pass out of the transformer through the conduit 11.

It will be readily seen in the drawings that the entire transformer core is supported by the primary leads to which it is connected by the clamping band 16, so that these primary leads in addition to acting as electric conductors form the mechanical supports of the core and windings thereon. In this way, any possibility of leakage through separate supporting members is eliminated. There is in addition a considerable advantage of convenience in inspecting the transformer, as by merely removing the cover the entire transformer is drawn out of the tank without disturbing any of the electrical or mechanical connections.

The tank is filled almost to the top with oil 28 for the purpose of filling up the spaces in the transformer and increasing the dielectric strength, and also assists in conducting heat away from the windings and core to the tank.

Having now fully described my invention, I declare that what I claim is:—

1. In a transformer a tank containing oil, a core submerged therein, an insulating bushing on said core, primary and secondary windings on said bushing, a suspension member for said core and windings forming the terminals of the primary winding, a second insulating bushing, and a pair of rods passing through said last mentioned bushing and connected to the terminals of the primary winding.

2. In a transformer, a casing adapted to contain oil, a core within the casing, primary and secondary windings on said core, an insulating bushing separating said windings, a clamped ring surrounding said bushing composed of two electrically separated members connected to opposite ends of the primary winding, a second insulating bushing entering the casing, bars forming the primary leads passing through said second bushing and connected at their lower extremities to the two members of the clamping ring.

3. In a transformer a tank containing oil, a cover therefor, an insulating bushing passing through said cover, primary leads passing through said bushing, a transformer core within said tank, primary and secondary windings on said core, and a supporting member for said core forming the electrical connection between the primary winding and primary leads.

4. In a transformer a tank containing oil, a cover therefor, a core having primary and secondary windings located within said tank, a pair of rods suspending said core and forming the primary conductors, and a conduit for the secondary leads connected to the tank cover.

5. In a transformer a tank, a cover therefor, an insulating bushing passing through said cover having a supporting shoulder resting on said cover, a pair of rods passing through said bushing forming the primary leads, a core having primary and secondary windings located in the tank, a clamping ring in circuit with the primary winding supporting the core from the primary leads, means supporting the primary leads in the bushing, and a conduit for the secondary leads carried by the tank cover.

6. In a transformer a core, an insulating bushing thereon, primary and secondary windings on said core separated by said bushing, a clamping ring formed in two parts surrounding said bushing, each part of said clamping ring being electrically connected to one end of the primary winding, a core supporting rod connected to one end of each member of said clamping ring, and insulating means mechanically connecting the opposite ends of said clamping ring members.

7. In a transformer a casing, a core, primary and secondary windings on said core, and primary leads suspending said core and windings within the casing.

8. In a transformer a casing, a cover therefor, a core, primary and secondary windings on said core, primary leads supported by the cover suspending said core and windings within the casing.

9. In a transformer a casing, a cover therefor, a core, primary and secondary windings on said core, terminals for said primary winding, primary leads supported by said cover suspending the core and windings by means of the terminals of the primary winding.

10. In a transformer a casing, a cover therefor, an insulating bushing supported by said cover, a core, primary and secondary windings on said core, and conductors connected to said primary winding supported by the insulating bushing and suspending the core and windings thereon within the casing.

In witness whereof I have hereunto set my hand in the presence of two witnesses.

EDSON C. WESCOTT.

Witnesses:
V. L. HATFIELD,
M. A. LOCKART.

---

Copies of this patent may be obtained for five cents each, by addressing the "Commissioner of Patents, Washington, D. C."